United States Patent [19]
Torigoe et al.

[11] 4,139,690
[45] Feb. 13, 1979

[54] PROCESS FOR PREPARING CONJUGATED DIENE POLYMERS

[75] Inventors: Yoshikazu Torigoe; Noboru Ohshima; Masaaki Watanabe, all of Yokkaichi; Eitaro Okuya, Mie, all of Japan

[73] Assignee: Japan Synthetic Rubber Co., Ltd., Tokyo, Japan

[21] Appl. No.: 769,038

[22] Filed: Feb. 16, 1977

[30] Foreign Application Priority Data

Feb. 20, 1976 [JP] Japan .................................. 51-17538

[51] Int. Cl.$^2$ .............................................. C08F 4/56
[52] U.S. Cl. .................................. 526/174; 526/180; 526/181; 526/225
[58] Field of Search .......................... 526/174, 180, 181

[56] References Cited

U.S. PATENT DOCUMENTS

| 3,324,191 | 6/1967 | Wofford | 526/174 |
|---|---|---|---|
| 3,644,312 | 2/1972 | Cheng et al. | 526/174 |
| 3,644,313 | 2/1972 | Cheng et al. | 526/174 |
| 3,734,898 | 5/1973 | Komastus et al. | 526/174 |
| 3,763,126 | 10/1973 | Favvar | 526/174 |
| 3,767,632 | 10/1973 | Aalasa | 526/174 |
| 3,769,267 | 10/1973 | Cheng et al. | 526/174 |
| 3,775,392 | 11/1973 | Cheng et al. | 526/174 |
| 3,935,176 | 1/1976 | Hawkins et al. | 516/19 |

FOREIGN PATENT DOCUMENTS 2119766 12/1970 France ..................................... 526/174

Primary Examiner—William F. Hamrock
Attorney, Agent, or Firm—Cooper, Dunham, Clark, Griffin & Moran

[57] ABSTRACT

A process for preparing conjugated diene polymers by either polymerization of one or more monomers selected from a group of conjugated diene compounds or copolymerization of a conjugated diene compound with an alkenyl aromatic compound, using an organolithium initiator in a hydrocarbon solvent, characterized in that the polymerization is carried out in the presence of
(1) one or more anionic surface active agent having a group —$SO_3M$ or —$OSO_3M$ (where M is an alkali metal) and
(2) one or more Lewis bases.

14 Claims, 4 Drawing Figures

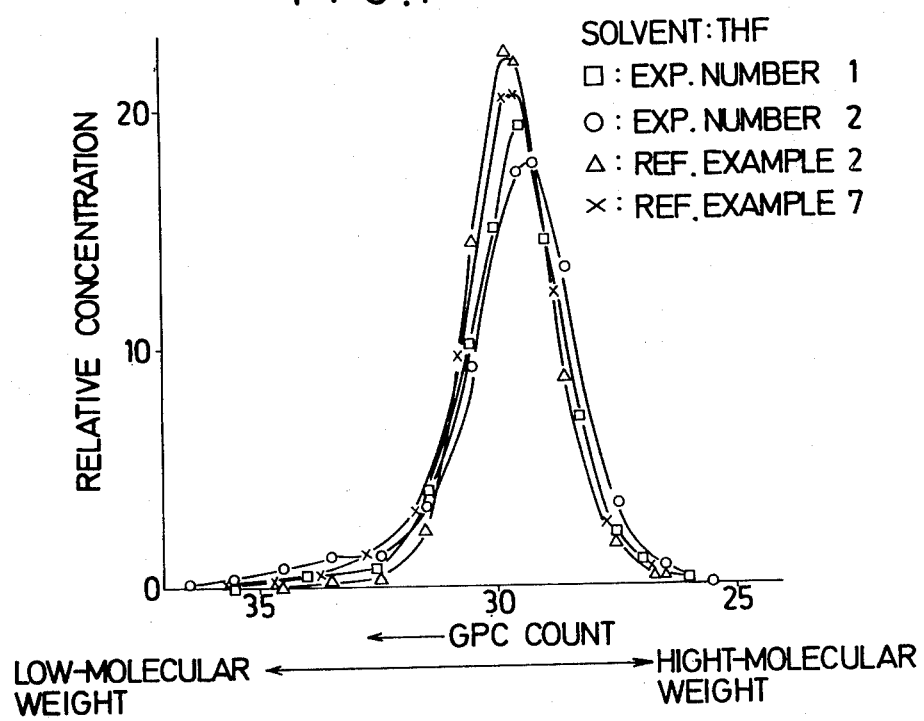
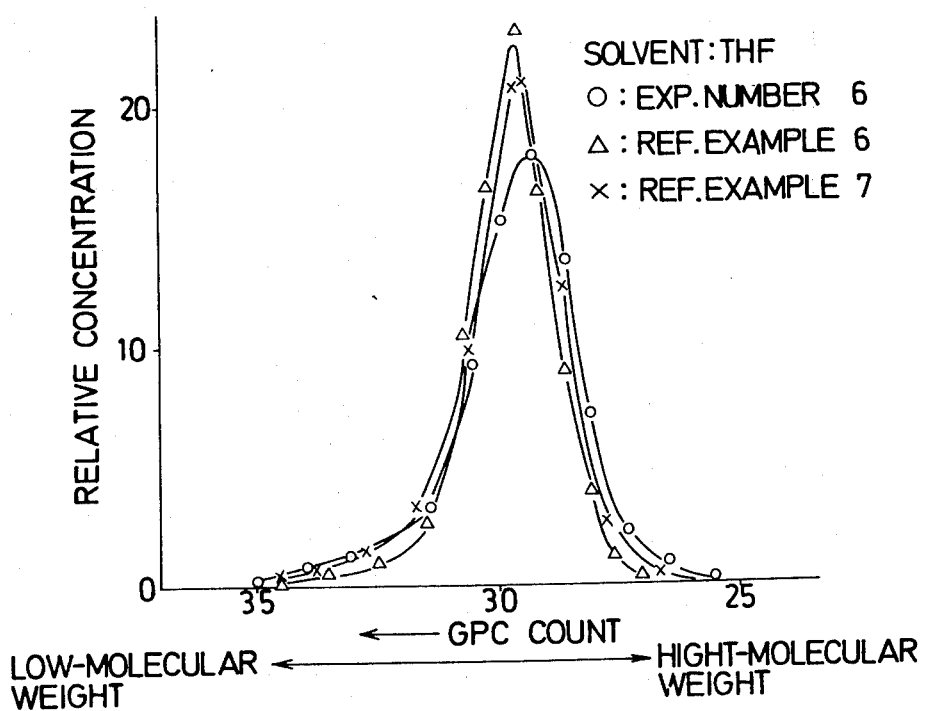

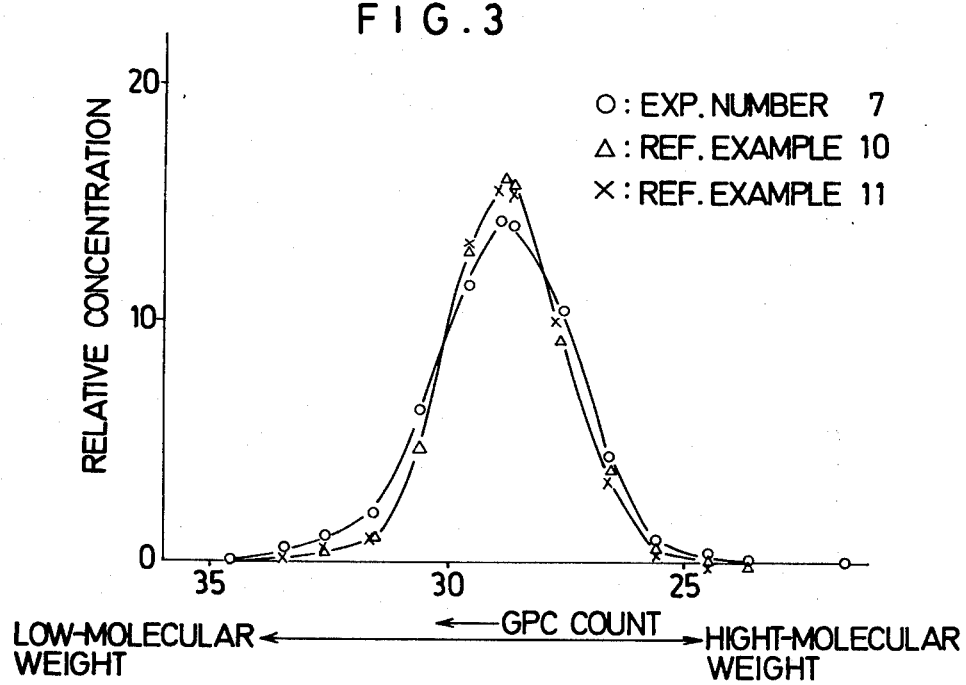
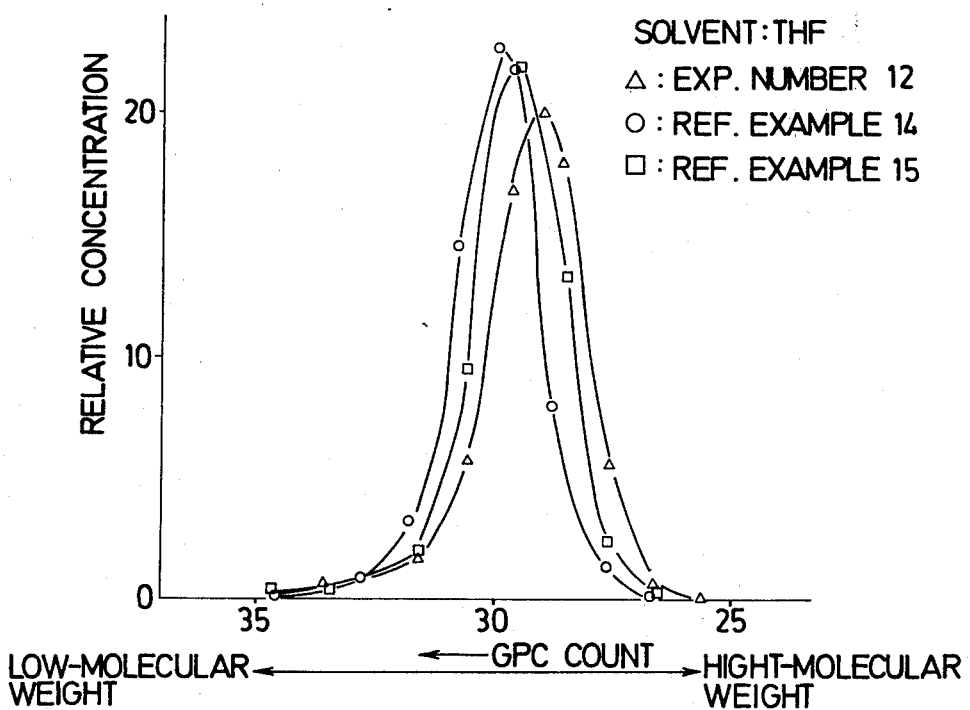

PROCESS FOR PREPARING CONJUGATED DIENE POLYMERS

This invention relates to a process for preparing conjugated diene polymers by either polymerizing at least one selected from a group of conjugated diene compounds or copolymerizing a conjugated diene compound with an alkenyl aromatic compound.

Generally, the conjugated diene polymer obtained by use of an organolithium compound in a hydrocarbon solvent are characterized by narrow ranges of molecular weight distribution. For applications within the normally accepted rubber areas, however, such polymers are desired to have broader ranges of molecular weight distribution for better roll-workability, processability and physical properties. For conventional uses, particularly in tyre making the rubbers are required to possess excellent abrasion resistance and skid resistance. To this end it is important that the microstructures of the polymers be controlled within optimum ranges. Heretofore, the control of the microstructure of each conjugated diene polymer obtained by an organolithium initiator in a hydrocarbon solvent has been attempted at by the use of a Lewis base, such as an ether or tertiary amine, or by the addition of an alkali metal salt. However the both methods give products having a common disadvantage of rather too narrow ranges of molecular weight distribution.

As the above stated, heretofore, in the conjugated diene polymer obtained by use of an organolithium, it is difficult to obtain the wide ranges of molecular weight distribution and to control the microstructures within optimum ranges.

When a conjugated diene compound and an alkenyl aromatic compound are copolymerized in a hydrocarbon solvent with use of an organolithium initiator, a block copolymer will be produced. However, it is a random copolymer rather than a block copolymer that is suited as a rubber for tyre use. It is the reason why the vulcanized rubber of random copolymer has a small amount of internal heat build-up and a superior wearing properties in a practical use.

In order to prepare a random copolymer of a conjugated diene compound and an alkenyl aromatic compound in a hydrocarbon solvent and by use of an organolithium initiator, it has been proposed and in use to add, as a randomizing agent, a Lewis base such as ether or tertiary amine (U.S. Pat. No. 2,975,160). However the process often brings a random copolymer in which the vinyl content of the conjugated diene is as much as 50% or upwards so that a wearing properties and a internal heat build-up in tyre use will be decreased, and no random copolymer with a low vinyl content will result. In addition, the product tends to be rather too narrow in molecular weight distribution.

Similar attempts have been made in which a tertiary alcohol, secondary amine, phenol, organosulfonic acid, or some other compound of alkali metal (Na,K,Lo,Cs) salt is used as a randomizing agent to prepare a random copolymer having a low vinyl content in the conjugated diene portion (Japanese patent publication No. 22338/70 and U.S. Pat. No. 3,331,821). These randomizing agents are only slightly soluble in hydrocarbon solvents, particularly in aliphatic and alicyclic hydrocarbons, and are cumbersome to handle in the process for polymerization.

The use of a surface active agent having a group $-SO_3Na$ or $-OSO_3Na$ brings a randomizing effect and permits control of the microstructures of the resulting polymer to some degree. However, a large addition of the alkali metal salt to the polymerization system to obtain a polymer with a high 1,2-vinyl content will tend to reduce the polymerization activity significantly and give a product with molecular weight distribution in a narrow range.

As a result of studies for overcoming the aforedescribed difficulties, we have now found that a diene polymer with excellent properties can be prepared by polymerizing a conjugated diene compound or compounds or copolymerizing a conjugated diene compound with an alkenyl aromatic compound in a hydrocarbon solvent and by use of an organolithium initiator, especially in the presence of a Lewis base and a surface active agent having a group $-SO_3M$ or $-OSO_3M$ (where M is an alkali metal).

The process of the invention makes it possible not only to prepare polymers of desired molecular weight distributions, broad or narrow in range, but also to control the microstructures of the resulting polymers over extensive ranges without causing any drop in the polymerization activities. Thus, polymers with high 1,2-vinyl contents can be obtained more efficiently than when Lewis bases alone are used. The mixture consisting of combinations of Lewis bases and anionic surface active agents having a group $-SO_3M$ or $-OSO_3M$ (where M is an alkali metal) exhibit remarkably improved solubility in hydrocarbon solvents, providing ease of handling during the course of polymerization. Furthermore, the present process permits achievement of an adequate randomizing effect with a smaller amount of a randomizing agent than in the prior art processes.

Other advantages of the present process are derived from the fact that the solution viscosity of the polymerization mixture is substantially lower than in conventional processes. This necessitates less power consumption for agitation, and makes the adjustment of the polymerization temperature easier, and permits the use of a lower solvent-to-monomer ratio, that is, the polymerization in a higher monomer concentration, than heretofore.

Typical examples of the organolithium initiators useful in the practice of the invention are alkyl lithiums, such as ethyl lithium, propyl lithium, n-butyl lithium, sec-butyl lithium, or tert-butyl lithium; aryl lithiums, such as phenyl lithium or tolyl lithium; alkenyl lithium, such as vinyl lithium or propenyl lithium; alkylene dilithiums, such as tetramethylene dilithium, pentamethylene dilithium, hexamethylene dilithium, or decamethylene dilithium; arylene dilithiums, such as 1,3-dilithiobenzene or 1,4-dilithiobenzene; and 1,3,5-trilithiocyclohexane, 1,2,5-trilithionaphthalene, 1,3,5,8-tetralithiodecane, and 1,2,3,5-tetralithio-4-hexyl-anthracene. Of these initiators, n-butyl lithium, sec-butyl lithium, tert-butyl lithium, and tetramethylene dilithium are preferable, and n-butyl lithium is most preferred.

The amount of the organolithium initiator to be used depends on the polymerization rate and the molecular weight of the product polymer desired. In terms of lithium atoms, usually an amount from 0.02 to 5 milligram atoms, preferable from 0.05 to 2 milligram atoms, per 100 grams of the total monomer will give satisfactory result.

The anionic surface active agents that have a group —SO$_3$M or —OSO$_3$M (where M is an alkali metal) include the following compounds:

a. Alkylaryl sulfonates, such as

Dodecylbenzene sulfonates, tetradecylbenzene sulfonates, hexadecylbenzene sulfonates, octadecylbenzene sulfonates, dibutylnaphthalene sulfonates, n-hexylnaphthalene sulfonates, dibutylphenyl-sulfonates, and formalin condensates of naphthalene sulfonates.

Of these sulfonates, potassium dodecylbenzene sulfonate, potassium tetradecylbenzene sulfonate, potassium hexadecylbenzene sulfonate, and potassium octadecylbenzene sulfonate are particularly desirable.

b. Amide-bound sulfonates, such as

N-methyl-N-oleoyl taurates, N-methyl-N-lauroyl taurates, N-phenyl-N-stearoyl taurates, and lauroylamide N-methyl-N-methane sulfonates.

Of these sulfonates, potassium laurylamide N-methyl-N-methane sulfonate is preferred.

c. Ester-bound sulfonates, such as

Salts of condensation products of oxyethane sulfonate and oleic acid ($C_{17}H_{38}COOCH_2CH_2SO_3M$), salts of dioctyl sulfosuccinate, and salts of dioctyl sulfomaleate.

Of these salts, potassium salt of dioctyl sulfosuccinate is most desirable.

d. Sulfuric ester salts of higher alcohols, such as

Sulfuric ester salts of lauryl, oleyl, and stearlyl alcohols.

Of these, potassium salt of sulfuric ester of lauryl alcohol gives best result.

e. Ester-bound sulfuric ester salts, such as

Sulfuric ester salts of lauroyl trimethylene glycol ($C_{11}H_{23}COOCH_2CH_2CH_2OSO_3M$) and sulfuric ester salts of caproyl ethylene glycol ($C_5H_{11}COOCH_2CH_2OSO_3M$). Also, various other sulfonates and sulfuric ester salts, such as sulfuric ester salts of polyoxyethylene alkyl ether and of polyoxyethylene alkylphenyl ether, may be employed.

Of these, potassium salt of sulfuric ester of caproyl ethylene glycol is preferable.

Among the anionic surface active agents in groups a. through e. mentioned above, those in the group a. are most desirable.

The amount of the surface active agent to be used in practicing the invention is between 0.01 and 10 gram atoms on the basis of alkali metal atoms per atom of lithium in the initiator. Less than 0.01 gram atom will be too little to achieve the beneficial effects according to the invention, whereas more than 10 gram atoms will decrease the polymerization activity, making it difficult to give a high-molecular weight polymer.

Typical Lewis bases include ethers, tertiary amines, phosphines, and sulfides. Examples of useful ethers are diethyl ether, di-n-propyl ether, di-isopropyl ether, di-n-butylether, ethyl butyl ether, ethylene glycol dimethyl ether, diethylene glycol diethyl ether, triethylene glycol dimethyl ether, tetrahydrofuran, α-methoxytetrahydrofuran, α-methyltetrahydrofuran, dioxane, and 1,2-dimethoxybenzene. Among useful tertiary amines are trimethylamine, triethylamine, N,N,N',N'-tetramethylethylenediamine, N-methylmorpholine, N-ethylmorpholine, and N-phenylmorpholine. Suitable sulfide compounds are dialkyl and diallyl sulfides. Moreover, certain phosphorus compounds, e.g., hexamethyl phosphoric triamide, may be used.

Of the Lewis bases mentioned above, preferred ones are diethyl ether, di-n-butyl ether, ethylene glycol dimethyl ether, ethylene glycol diethyl ether, diethylene glycol diethyl ether, tetrahydrofuran, dioxane, triethylamine, and N,N,N',N'-tetramethyl ethylenediamine. Most preferred are ethylene glycol dimethyl ether, diethylene glycol dimethyl ether, and tetrahydrofuran.

In accordance with the invention, the Lewis base is used in an amount from 0.02 to 100 moles, preferably from 0.05 to 50 moles, per mole of the lithium atoms. If the amount is less than 0.02 mole or more than 100 moles, a polymer with a broad range of molecular weight distribution will seldom result. Bifunctional Lewis bases, such as ethylene glycol dimethyl ether or N,N,N',N'-tetramethyl ethylenediamine, prove substantially more active than the monofunctional ones, such as diethyl ether, tetrahydrofuran, or triethylamine, and therefore they may be used in smaller amounts than the latter.

It is possible to increase the amount of either anionic surface active agent or Lewis base in the practice of the invention, so that the resulting polymer can have an accordingly increased 1, 2 bond content.

Examples of the conjugated diene compounds useful for the invention are 1,3-butadiene, isoprene, 1,3-pentadiene, 2,3-dimethyl butadiene, and 2-phenyl-1,3-butadiene. Of these, 1,3-butadiene is most desirable.

The vinyl aromatic hydrocarbon compound for use in copolymerization with a conjugated diene compound in accordance with the invention is, for example, styrene, divinyl benzene, α-methyl styrene, β-methyl styrene, vinyl toluene, and 1-vinyl naphthalene. Styrene is most preferred. As for the proportions in the copolymerization, from about 0.02 to 1.0 part by weight of the vinyl aromatic hydrocarbon compound per part by weight of the conjugated diene compound will give desirable result.

There is no special limitation to the hydrocarbon solvent to be employed. Aliphatic, alicyclic, and aromatic hydrocarbons which remain in liquid state under the polymerization conditions of the present process may be used. Desirable hydrocarbon solvents include propane, n-butane, iso-pentane, n-hexane, n-heptane, iso-octane, n-decane, cyclopentane, methyl cyclopentane, cyclohexane, ethyl cyclohexane, and benzene. Particularly desirable solvents are n-hexane, n-heptane, cyclohexane, and benzene and the like. These hydrocarbon solvents may be used singly or in mixture of two or more.

Such a hydrocarbon solvent is desirably used in an amount from about one to 20 parts by weight per one part by weight of the total monomer.

The polymerization temperature usually ranges from −80° to 150° C., preferably from −20° to 90° C.

The pressure of the reaction system has only to be high enough to maintain the reaction mixture in a liquid phase. While it usually ranges from about one to 10 atm., a higher or lower pressure may be used for a reaction under certain conditions.

Desirably the polymerization reaction is carried out in an atmosphere of an inert gas such as argon, nitrogen.

For good result the organolithium initiator is diluted, prior to the addition to the reaction system, with the solvent to be used for the polymerization reaction.

It is preferable to start the polymerization with the addition of the organolithium compound to the system comprising the hydrocarbon solvent and the monomer, following the addition of the anionic surface active agent and the Lewis base in accordance with the invention. Alternatively, the organolithium initiator in contact with the anionic surface active agent and Lewis base of the invention may altogether be introduced into the system of the hydrocarbon solvent and monomer to initiate the polymerization. According to purposes, the anionic surface active agent and Lewis base of the invention may be added deliberately after the polymerization has proceeded to some extent.

After a desired degree of conversion has been arrived at in the polymerization reaction, an antioxidant and a shortstopping agent, such as water or alcohol, are added in the usual manner to terminate the polymerization. The polymer thus formed is separated, washed, and dried to obtain the objective polymer.

The present invention will be better understood from the following description of examples thereof, taken in conjunction with the accompanying drawings, which are not in any way limitative but modifications and alterations are possible without departing from the spirit of the invention.

In the drawings:

FIGS. 1 and 2 are graphs showing the molecular weight distributions of products obtained in Example 1, as determined by gel-permeation chromatograms;

FIG. 3 is a graph similar to FIGS. 1 and 2 showing the molecular weight distributions of products obtained in Example 2; and FIG. 4 is a graph similar to FIGS. 1 and 2 showing the molecular weight distributions of products obtained in Example 4.

Throughout the examples of the invention, the microstructures of polybutadiene portions were examined by the method proposed by D. Morero [Chim e Ind., 41 758 (1959)], and the microstructures of polyisoprenes by the method of F. Ciampelli et al. [Makromol. Chem., 61 250 (1963)].

The styrene contents of copolymers were determined from the measured curves of absorbance at 699 cm$^{-1}$.

sulfonate (DBS-K), and one of various ethers added in varying amounts, experiments were made for the copolymerization of 1,3-butadiene with styrene.

Each run of the polymerization was carried out in the following way. Into a thoroughly dried 300-ml. pressure bottle were placed 126 g of dried cyclohexane and 14 g of n-hexane, in an atmosphere of nitrogen. Then, an ether and potassium dodecylbenzene sulfonate in predetermined amounts as given in Table 1 and 3 g of styrene were added. The pressure bottle was sealed with a crown and a rubber packing. Through the rubber packing, 17 g of 1,3-butadiene from a pressure tube was injected by means of a syringe and dissolved in the solvent in the bottle. Finally 0.25 millimole of n-butyl lithium was added. The charged bottle was placed in a polymerization tank at 50° C. and polymerization was initiated. Fifteen minutes after the initiation, 5 g of the polymer solution was sampled out of the bottle by a syringe, and the total solids were weighed and the conversion was determined. Two hours later the polymerization was terminated by adding 0.2 ml. of isopropyl alcohol that contained 0.01 g of 2,6-ditertiary-butyl-4-methyl phenol.

Following the termination of the polymerization the polymer solution was coagulated and precipitated in one liter of methanol. The precipitated polymer was dried at 60° C. for 17 hours under reduced pressure to obtain a product polymer.

It will be seen from Table 1 that the polymerization in the presence of the ternary catalyst consisting of n-butyl lithium (n-BuLi), potassium dodecylbenzene sulfonate (DBS-K), and ether proceeds fast, with adequate polymerization activity, to a conversion of nearly 100%. Also, it will be understood that the 1,2-vinyl content of each product polymer can be controlled by the amount of the ether to be added.

The molecular weight distribution of each product was determined with a G.P.C. (gel-permeation chromatogram).

Table 1

| Exp. No. | n-BuLi (mM) | DBS-K (mM) | DIGLYME (mM) | THF (mM) | Conversion (%) 15 min | Conversion (%) 120 min | $[\eta]\frac{TL}{30°}C$ | Microstructures (%), bound styrene cis | trans | vinyl | ST |
|---|---|---|---|---|---|---|---|---|---|---|---|
| 1 | 0.25 | 0.025 | 0.025 | 0 | 52 | 100 | 1.23 | 23 | 39 | 38 | 15.0 |
| 2 | 0.25 | 0.025 | 0.050 | 0 | 63 | 100 | 1.20 | 20 | 35 | 45 | 15.0 |
| 3 | 0.25 | 0.025 | 0.125 | 0 | 78 | 100 | 1.12 | 15 | 26 | 59 | 14.9 |
| 4 | 0.25 | 0.025 | 0 | 1.25 | 46 | 97 | 1.29 | 25 | 44 | 31 | 15.1 |
| 5 | 0.25 | 0.025 | 0 | 2.50 | 58 | 100 | 1.22 | 24 | 42 | 34 | 15.0 |
| 6 | 0.25 | 0.025 | 0 | 5.00 | 65 | 100 | 1.19 | 22 | 34 | 44 | 15.0 |
| Referential Examples | | | | | | | | | | | |
| 1 | 0.25 | 0 | 0.025 | 0 | 41 | 99 | 1.21 | 28 | 42 | 30 | 15.0 |
| 2 | 0.25 | 0 | 0.050 | 0 | 55 | 98 | 1.20 | 20 | 36 | 44 | 15.0 |
| 3 | 0.25 | 0 | 0.125 | 0 | 60 | 97 | 1.18 | 18 | 31 | 51 | 15.0 |
| 4 | 0.25 | 0 | 0 | 1.25 | 36 | 97 | 1.16 | 27 | 45 | 28 | 14.9 |
| 5 | 0.25 | 0 | 0 | 2.50 | 51 | 100 | 1.12 | 25 | 42 | 33 | 14.9 |
| 6 | 0.25 | 0 | 0 | 5.00 | 59 | 99 | 1.12 | 24 | 36 | 40 | 15.0 |
| 7 | 0.25 | 0.025 | 0 | 0 | 26 | 97 | 1.38 | 34 | 49 | 17 | 14.9 |
| 8 | 0.25 | 0.125 | 0 | 0 | 50 | 59 | 1.51 | 27 | 41 | 32 | 24.9 |
| 9 | 0.25 | 0.250 | 0 | 0 | 11 | 15 | 1.34 | 14 | 40 | 46 | 43.6 | n-BuLi : n-Butyl lithium
DBS-K : Potassium dodecylbenzene sulfonate (hard type)
DIGLYME : Diethylene glycol dimethyl ether
THF : Tetrahydrofuran
TL : Toluene The conversions were calculated on the basis of the weights of the polymer solution and of the total solids formed upon evaporation and drying of the same solution.

EXAMPLE 1

Using catalyst systems, each consisting of a given amount of n-butyl lithium, potassium dodecylbenzene The results, graphically represented in FIGS. 1 and 2, clearly indicate that the ternary catalysts of n-BuLi:DBS-K: DIGLYME and n-BuLi;DBS-K:THF systems give polymers of broader molecular weight distributions than by the binary catalysts of n-BuLi:DBS-K, n-BuLi:DIGLYME, and n-BuLi:THF systems. It can also be seen from Exp. Nos. 1 and 2 in FIG. 1 that the molecular weight distribution can be controlled by varying the amount of DIGLYME and, from Reference Examples 7, 8 and 9, that an increase in the proportion of DBS-K results in an increase in the 1,2-vinyl percentage of the resulting polymer but it seriously reduces the conversion and affects the polymerization activity.

EXAMPLE 2

Under the conditions summarized in Table 2, 1,3-butadiene was polymerized in three different runs and polymers of substantially the same Mooney viscosities were prepared, and then the relations between their physical properties and the details of the polymerization procedure followed were investigated. The polymerization was generally carried out as below. The solvents and 1,3-butadiene, both in dry and refined state, were placed in a thoroughly dried 10-liter autoclave in which the atmosphere had been replaced by nitrogen gas. A predetermined amount of potassium dodecylbenzene sulfonate and/or a predetermined amount of diethylene glycol dimethyl ether was added. Then, the temperature inside the polymerization vessel was increased to 50° C., and a predetermined amount of n-butyl lithium was added to initiate the polymerization. The polymerization temperature was maintained at 50° ± 20° C.

Table 2

| Conditions for polymerization | Exp. No. 7 | Ref. Ex. 10 | Ref. Ex. 11 |
|---|---|---|---|
| Solvents Cyclohexane (g) | 3780 | 3780 | 3780 |
| Hexane (g) | 420 | 420 | 420 |
| 1,3-Butadiene (g) | 600 | 600 | 600 |
| n-BuLi (mM) | 4.68 | 4.45 | 4.62 |
| Potassium dodecylbenzene sulfonate (mM) | 0.514 | 0 | 0.62 |
| Diethylene glycol dimethyl ether (mM) | 0.70 | 0.72 | 0 |
| Polymerization temp. (° C) | 50 | 50 | 50 |
| Polymerization time (hr) | 3.0 | 3.0 | 4.0 |

After the polymerization for a predetermined period of time, a cyclohexane solution containing 5 g of 2,6-ditertiary-butyl-4-methylphenol was added to terminate the polymerization. By the steam stripping the solvents were removed, and the resulting polymer was passed along a roll at 100° C. for drying.

Table 3

|  | Exp. No. 7 (Example) | Ref. Ex. 10 | Ref. Ex. 11 |
|---|---|---|---|
| Microstructure (%): |  |  |  |
| Cis | 15.4 | 17.6 | 27.1 |
| Trans | 44.4 | 42.6 | 57.3 |
| Vinyl | 40.2 | 39.8 | 15.3 |
| Gel content (%) | 0 | 0 | 0 |
| Intrinsic viscosity $[\eta]_{30° C}^{toluene}$ | 2.04 | 2.15 | 2.21 |
| Mooney viscosity $ML_{1+4} 100°$ C | 43.0 | 42.5 | 43.5 |
| Cold flow (mg/min) | 3.8 | 10.2 | 11.1 |
| Rollability | Good | Poor | Poor |
| Properties of vulcanizate: |  |  |  |
| Hardness (JIS) | 68 | 68 | 68 |
| 300% modulus (kg/cm$^2$) | 93 | 73 | 89 |
| Tensile strength (kg/cm$^2$) | 177 | 170 | 175 |
| Elongation (%) | 500 | 470 | 480 |
| Skid resistance indices: |  |  |  |
| Against dry concrete | 103 | 100 | 90 |
| Against wet concrete | 62 | 60 | 55 |
| Rubber abrasion (Pico index) | 101 | 95 | 112 |

The characteristics of the polymer thus obtained and the physical properties of the vulcanized rubbers are given in Table 3. The molecular weight distributions of the polymer are plotted in FIG. 3 Comparing the present invention with the referential procedure using diethylene glycol dimethyl ether as the only co-catalyst, as typified in Exp. No. 7 versus Ref. Ex. 10, it will be clear that the polymer prepared in accordance with the invention is improved in cold flow and processability on rolls, or rollability, over the referential product. The vulcanizate too is superior in tensile strength, elongation, and wear resistance. It is also seen from a comparison of the present invention and the referential procedure in which potassium dodecylbenzene sulfonate alone was used as the co-catalyst, i.e., Exp. No. 7 against Ref. Ex. 11, that the product of the invention has better cold flow and rollability and the vulcanizate is improved in both elongation and skid resistance.

| Vulcanization conditions: 145° C |  | 40 min. |
|---|---|---|
| Compounding recipe: |  |  |
| Polymer | 100 | parts by weight |
| Carbon black (HAF) | 50 | " |
| Aromatic process oil | 5 | " |
| Zinc oxide | 3 | " |
| Stearic acid | 2 | " |
| Antioxidant (N-Phenyl-N'-isopropyl-P-phenylenediamine) | 1 | " |
| Vulcanization accelerator (Cyclohexyl-benzothlazyl sulfenamide) | 0.8 | " |
| Sulfur | 1.75 | " |

EXAMPLE 3

A 300-ml. conical flask was charged with a solvent mixture consisting of 45 g of cyclohexane and 4 g of n-hexane and predetermined amounts of potassium dodecylbenzene sulfonate and an ether as shown in Table 4. The whole mixture was dissolved by heating to 55° C. The flask was placed in a bath of ice and water, and the precipitation temperature for the potassium dodecylbenzene sulfonate was determined. The results are summarized in Table 4.

Table 4

|  |  | Type of ether |  | Precipitation |
|---|---|---|---|---|
| Exp. No. | DBS-K (g) | THF (g) | DIGLYME (g) | temp. (° C) |
| 8 | 1.25 | 1.78 | 0 | No precipitate at 0° C |
| 9 | 2.50 | 1.78 | 0 | " |
| 10 | 1.25 | 0 | 0.095 | " |
| 11 | 2.50 | 0 | 0.095 | " |
| Ref. Ex. |  |  |  |  |
| 12 | 1.25 | 0 | 0 | 37 |
| 13 | 2.50 | 0 | 0 | 47 |

As can be seen from Table 4, the precipitation temperature is substantially decreased by adding a small amount of tetrahydrofuran (THF) or diethylene glycol dimethyl ether (DIGLYME) to the solution of potassium dodecylbenzene sulfonate in cyclohexane and n-hexane. In other words, the addition is contributory to a remarkable improvement in the solubility.

EXAMPLE 4

In the presence of sodium dodecylbenzene sulfonate (DBS-Na) and diethylene glycol dimethyl ether (DIGLYME), 1,3-butadiene and styrene were copolymerized with the addition of n-butyl lithium, under the conditions given in Table 5.

In all runs the procedure followed was the same as that described in Example 1. The results, compiled in FIG. 4 and Table 5, indicate that the presence of both DBS-Na and DIGLYME in the polymerization system results in good polymerization activity and gives a polymer having a high 1,2-vinyl percentage and broad molecular weight distribution.

Table 5

| Exp. No. | DBS-Na (mM) | DIGLYME (mM) | Conversion (%) (120 min) | $[\eta] \frac{Tl}{30^\circ}$ C | Microstructures (%) | | |
|---|---|---|---|---|---|---|---|
| | | | | | Cis | Trans | Vinyl |
| 12 | 0.025 | 0.050 | 95 | 1.24 | 14 | 22 | 64 |
| 13 | 0.050 | 0.050 | 95 | 1.52 | 8 | 10 | 82 |
| Ref. Ex. | | | | | | | |
| 14 | 0 | 0.050 | 96 | 1.12 | 17 | 22 | 61 |
| 15 | 0.025 | 0 | 84 | 1.31 | 34 | 51 | 15 |
| 16 | 0.050 | 0 | 86 | 1.39 | 34 | 50 | 16 |

Polymerization recipe:
1.3,-Butadiene: 17 g
Styrene: 3 g
Solvent-Cyclohexane: 140 g
n-Butyl lithium: 0.25 mM
DBS-Na & DIGLYME: (predetermined amounts)
Polymerization temperature: 50° C.

EXAMPLE 5

In the presence of potassium dodecylbenzene sulfonate (DBS-K) and N,N,N',N'-tetramethyl ethylenediamine (TMEDA), isoprene was polymerized with use of n-butyl lithium under the conditions given in Table 6. The polymerization procedure was similar to that described in Example 1. Table 6 shows the results. The presence of DBS-K and TMEDA was beneficial in preparing a polymer with a high 3,4-structure and relatively broad molecular weight distribution.

Table 6

| Exp. No. | DBS-K (mM) | TMEDA (mM) | Conversion (%) (180 min) | $[\eta] \frac{Tl}{30^\circ}$ C | Microstructures (%) | | | | Molecl weight distrn |
|---|---|---|---|---|---|---|---|---|---|
| | | | | | Cis-1,4 | Trans-1,4 | 3,4 | 1,2 | |
| 14 | 0.025 | 0.050 | 65 | 1.21 | 29 | 38 | 33 | 0 | Broad |
| Ref. Ex. | | | | | | | | | |
| 17 | 0.025 | 0 | 35 | 1.15 | 90 | 3 | 7 | 0 | Narrow |
| 18 | 0 | 0.050 | 60 | 1.10 | 57 | 27 | 16 | 0 | Narrow |

Polymerization recipe:
Isoprene: 20 g
Solvent - benzene: 140 g
n-Butyl lithium: 0.25 mM
DBS-K & TMEDA: (predetermined amounts)
Polymerization temperature: 50° C.

EXAMPLE 6

In the same way as described in Example 1, a copolymerization reaction of 3 g of styrene and 17 g of 1,3-butadiene was carried out.

The amount of initial bound styrene formed was determined by analyzing the infrared absorption spectrum of each sample following the determination of the conversion after 15 minutes.

It will be appreciated from a comparison of Exp. Nos. 15 and 16 with Referential Examples 19 and 20 in Table 7 that a small addition of tetrahydrofuran in accordance with the invention brings an increase in the percentage of initial styrene, and therefore the product can be randomized despite the reduction of the DBS-K amount to about a half and, moreover, the polymerization activity is improved. The results with Referential Examples 21 and 22 indicate that tetrahydrofuran alone, even if used in a large amount, will fail to give adequate randomization.

Table 7

| Exp. No. | DBS-K (mM) | THF (mM) | Conv. (%) 15 min | Conv. (%) 120 min | Init-bound styrene (%) (15 min) | $[\eta] \frac{Tl}{30^\circ}$ C | Microstructures (%) | | |
|---|---|---|---|---|---|---|---|---|---|
| | | | | | | | Cis-1,4 | Trans-1,4 | 1,2-vinyl |
| 15 | 0.026 | 0.10 | 25 | 96 | 17.8 | 1.45 | 82.1 | 47.4 | 20.5 |
| 16 | 0.013 | 0.10 | 24 | 95 | 14.5 | 1.55 | 31.9 | 49.6 | 18.5 |
| Ref. Ex. | | | | | | | | | |
| 19 | 0.026 | 0 | 21 | 92 | 14.0 | 1.50 | 35.6 | 49.0 | 15.4 |
| 20 | 0.013 | 0 | 19 | 90 | 10.0 | 1.49 | 36.4 | 48.6 | 15.0 |
| 21 | 0 | 0.10 | 20 | 81 | 1.0 | 1.32 | 23.5 | 50.8 | 15.7 |
| 22 | 0 | 2.50 | 53 | 93 | 6.4 | 1.41 | 23.8 | 40.9 | 35.3 | n-BuLi : 0.25 mM
DBS-K : Potassium dodecylbenzene sulfonate (hard type)
THF : Tetrahydrofuran
Note: "Initial bound styrene"

Because the styrene content of the monomeric mixture subjected to the polymerization in this example was 15%, it follows that an initial styrene amount (the styrene content of the polymer in the early stage of polymerization) of 15% would mean that there had been an optimum amount of the randomizing agent in the polymerization system. Accordingly, an initial styrene of more than 15% would mean an excessive randomizing agent in the polymerization system, and an initial styrene of less than 15% would mean an insufficiency.

EXAMPLE 7

Using potassium dodecylbenzene sulfonate of the soft type and anisole, styrene and butadiene were copolymerized in a solvent mixture of cyclohexane and isooctane (in a ratio by weight of 9:1) in the same manner as described in Example 6. The polymerization conditions used and the results are given in Table 8. It will be seen that the addition of anisole to DBS-K will improve the randomizing effect and polymerization activity. When anisole alone is used, even in an increased amount, it will have little effect as a randomizing agent.

Table 8

| Exp. No. | DBS-K (mM) | Anisole (mM) | Conv. (%) 15 min | Conv. (%) 120 min | Initial bound styrene (%) (15 min) | $[\eta]\,^{T/}_{30}\,C$ | Microstructures (%) Cis-1,4 | Trans-1,4 | 1,2-vinyl |
|---|---|---|---|---|---|---|---|---|---|
| 17 | 0.016 | 1.55 | 18 | 94 | 8.2 | 1.33 | 34.8 | 51.2 | 13.0 |
| 18 | 0.026 | 2.55 | 23 | 98 | 12.9 | 1.21 | 33.8 | 50.1 | 16.1 |
| 19 | 0.042 | 4.05 | 24 | 96 | 17.8 | 1.29 | 33.2 | 49.0 | 17.8 |
| Ref. Ex. | | | | | | | | | |
| 23 | 0.026 | 0 | 15 | 96 | 8.8 | 1.20 | 34.9 | 50.6 | 14.5 |
| 24 | 0.042 | 0 | 22 | 98 | 15.0 | 1.31 | 34.2 | 49.2 | 16.6 |
| 25 | 0 | 1.55 | 8 | 86 | 1.2 | 1.13 | 36.7 | 52.6 | 10.7 |
| 26 | 0 | 2.55 | 14 | 87 | 2.0 | 1.16 | 36.7 | 52.6 | 10.7 |
| 27 | 0 | 4.05 | 21 | 86 | 2.6 | 1.08 | 35.8 | 53.0 | 11.2 | n-BuLi : 0.25mM
DBS-K : Potassium dodecylbenzene sulfonate (soft type)

EXAMPLE 8

A 10-liter vessel type reactor equipped with a jacket and a ribbon type agitator was charged, at the inlet on one side, with 2.550 kg/hr of 1,3-butadiene, 0.45 kg/hr of styrene, 12 kg/hr of cyclohexane (in Referential Examples 29 and 30, with 1.612 kg/hr of 1,3-butadiene, 0.284 kg/hr of styrene, 13.27 kg/hr of cyclohexane), 0.04 PHM of n-butyl lithium (PHM = parts by weight per 100 parts by weight of the monomers), 0.023 PHM of 1,4-dihydronaphthalene, a predetermined amount (as given in Table 9) of potassium dodecylbenzene sulfonate, and a predetermined amount (Table 9) of diethylene glycol dimethyl ether, at 10° C. Polymerization was carried out at 90° C., and the polymer solution being formed was continuously taken out of the vessel at the outlet on the other side. The power consumption for agitation in the reactor was determined by means of a wattmeter.

bers thus obtained, and the properties of the vulcanizates.

Referring to Table 9, the percentages of initial bound styrene and the block styrene contents determined by the oxidation decomposition method indicate that the polymerization systems, as of Exp. Nos. 20 to 23, wherein both potassium dodecyclbenzene sulfonate (DBS-K) and diethylene glycol dimethyl ether (DI-GLYME) were present were superior in the randomizing effect to the systems of Referential Examples 28 and 29 which used either catalyst alone. The presence of DIGLYME greatly reduces the solution viscosity of the polymerization system and accordingly decreases the power consumption for agitation, thus permitting the polymerization in a high monomer concentration. When DBS-K alone was employed the poor solubility in hydrocarbon solvents tended to give a gelled polymer. On the other hand, the presence of DIGLYME improved the solubility of the system to such as extent Table 9

| Exp. No. | DBS-K n-Buli Weight ratio | DI-GLYME (PHM) | Conv. (%) | Mooney viscty of polymer | Solvent monomer ratio | Agith power Conspn (KW/M³) | Initial bound styrene (%) | Block styrene (%) | Gel (%) |
|---|---|---|---|---|---|---|---|---|---|
| 20 | 0.4 | 0.008 | 97 | 96 | 4 | 0.80 | 14 | 0 | 0 |
| 21 | 0.4 | 0.012 | 98 | 103 | 4 | 0.86 | 16 | 0 | 0 |
| 22 | 0.4 | 0.018 | 98 | 101 | 4 | 0.83 | 18 | 0 | 0 |
| 23 | 0.4 | 0.029 | 98 | 101 | 4 | 0.84 | 20 | 0 | 0 |
| Ref. Ex. | | | | | | | | | |
| 28 | 0 | 0.029 | 97 | 102 | 4 | 0.90 | 4 | 6 | 0 |
| 29 | 0.4 | 0 | 98 | 101 | 7 | 0.92 | 11 | 0 | 0.01 |
| 30 | 0.8 | 0 | 90 | 102 | 7 | 0.90 | 15 | 0 | 0.05 |

Note:
1) Initial bound styrene:- The polymer solution yet to be polymerized was sampled in a nitrogen atmosphere from the front of the inlet of the reactor, polymerized at 50° C, and, when a conversion between 20 and 30% was achieved, the polymerization was terminated. The percentge of the bound styrene in the polymer was determined by infrared analysis.
2) Block styrene:- The percentage was determined by the method of Kolthoff,I.M.et al., J. Polymer Sci., 1 (5) 429 (1946).

To the polymer thus formed were added 1.0 part by weight of 2,6-ditertiary-butyl-P-cresole and 37.5 parts by weight of high aromatic process oil per 100 parts by weight of the polymer. Next, the polymer was freed from the solvents by steam stripping, and then was dried.

Tables 9 and 10 give brief summaries of the results of polymerization, the properties of the unvulcanized rubthat no gelled polymer resulted.

As regards the processability of the unvulcanized rubbers, Exp. Nos. 20, 21, 22 and 23 all indicated broad ranges of molecular weight distribution and not a trace of gel, thus proving good processability on the Banbury equipment. The vulcanizates exhibited excellent properties in respect of modulus and tensile strength.

Table 10

| | Properties of unvulcanized and vulcanized rubbers | | | | Referential Examples | | |
|---|---|---|---|---|---|---|---|
| Exp. No. | 20 | 21 | 22 | 23 | 28 | 29 | 30 |
| Properties of unvulcanized rubbers: Mooney viscosity (ML$_{1+5}$ 100° C) | 42.5 | 46.5 | 44.5 | 44.0 | 45.0 | 44.0 | 45.0 |

Table 10-continued

| | Properties of unvulcanized and vulcanized rubbers | | | | | | |
|---|---|---|---|---|---|---|---|
| | | | | | Referential Examples | | |
| Exp. No. | 20 | 21 | 22 | 23 | 28 | 29 | 30 |
| Bound styrene (%) | 14.8 | 14.9 | 14.9 | 14.9 | 14.7 | 14.9 | 14.9 |
| Microstructures: | | | | | | | |
| Cis-1,4 (%) | 33.9 | 32.8 | 30.5 | 26.3 | 26.2 | 36.4 | 35.6 |
| Trans-1,4 (%) | 49.8 | 49.2 | 49.0 | 48.7 | 48.8 | 50.4 | 50.3 |
| 1,2-Vinyl (%) | 16.3 | 18.0 | 20.5 | 25.0 | 25.0 | 13.2 | 14.1 |
| $\overline{Mw}/\overline{Mn}^{1)}$ | 2.7 | 2.8 | 2.9 | 3.1 | 2.70 | 2.4 | 2.2 |
| $[\eta]_{30°C}^{toluene}$ | 2.60 | 2.62 | 2.65 | 2.69 | 2.60 | 2.70 | 2.65 |
| Banbury processability$^{2)}$ | Good | Good | Good | Good | Rather poor | Rather poor | Poor |
| Properties of vulcanized rubbers: | | | | | | | |
| Hardness (JIS) | 58 | 58 | 58 | 58 | 59 | 58 | 58 |
| 300% modulus (kg/cm$^2$) | 100 | 100 | 98 | 97 | 89 | 100 | 100 |
| Tensile strength (kg/cm$^2$) | 192 | 193 | 193 | 189 | 174 | 187 | 165 |
| Elongation (%) | 490 | 500 | 500 | 500 | 490 | 490 | 430 |
| Pico abrasion index | 94 | 92 | 90 | 90 | 89 | 92 | 86 |
| Heat development$^{3)}$ ($\Delta T°$ C) | 21 | 21 | 22 | 22 | 24 | 22 | 22 |
| Impact resistance, JIS (%) | 60 | 59 | 58 | 56 | 53 | 59 | 56 |

Notes:
$\overline{Mw}/\overline{Mn}$: - Determined by Waters Co.'s Model 200 Gel-Permeation Chromatograph. Mw = weight average molecular weight: Mn = number average molecular weight.
21) Banbury processability:- Evaluated on the basis of time required for mixing on a Banbury mixer, collectability after mixing, and luster of the resulting unvulcanized rubber.
3) Heat development:- Determined by Goodrich Co.'s Flexometer. Measurement conditions: No. of cycles = 1800 cpm; load = 143 lb/in$^2$; stroke = 0.175 in.; measurement starting temperature = 38° C.

| Compounding recipe: | |
|---|---|
| | Parts by weight |
| polymer | 137.5 (Base polymer 100 + aromatic process oil 37.%) |
| Carbon black (HAF "Shoblack o") | 678.8 |
| Zinc oxide (ZnO) | 4 |
| Stearic acid | 2 |
| Antioxidant (N-Phenyl-N'-isopropyl-P-phenylenediamine) | 1 |
| Vulcanization accelerator (Cyclohexyl-benzothiazyl sulfenamide) | 1.4 |
| Sulfur | 2 |
| Vulcanization conditions: 145° C 40 min. | |

What is claimed is:

1. A process for preparing conjugated diene polymers by (1) polymerization of at least one monomer selected from the group consisting of conjugated diene compounds or (2) copolymerization of at least one monomer selected from the group consisting of conjugated diene compounds with at least one monomer selected from the group consisting of alkenyl aromatic compounds utilizing an organolithium initiator in a hydrocarbon solvent characterized in that the polymerization is carried out in the presence of
   (a) at least one anionic surface active agent substituted with a group selected from:
   —SO$_3$M or
   —OSO$_3$M
   wherein M is sodium or potassium, and
   (b) a Lewis base selected from the group consisting of ethers or tertiary amines.

2. A process according to claim 1 wherein said organolithium initiator is at least one compound selected from the group consisting of alkyl lithiums, aryl lithiums, alkenyl lithiums, alkylene dilithiums, and allylene dilithiums.

3. A process according to claim 1 wherein said organolithium initiator is at least one compound selected from the group consisting of ethyl lithium, propyl lithium, n-butyl lithium, sec.-butyl lithium, and tert.-butyl lithium, phenyl lithium, tolyl lithium, vinyl lithium, propenyl lithium, tetramethylene dilithium, pentamethylene dilithium, hexamethylene dilithium, decamethylene dilithium, 1,3-dilithiobenzene, 1,4-dilithiobenzene, 1,3,5-trilithiocyclohexane, 1,2,5-trilithionaphthalene, 1,3,5,8-tetralithiodecane, and 1,2,3,5-tetralithio-4-hexylanthracene.

4. A process according to claim 1 wherein said organolithium initiator is at least one compound selected from the group consisting of n-butyl lithium, sec.-butyl lithium, tert.-butyl lithium, and tetramethylene dilithium.

5. A process according to claim 1 wherein said organolithium initiator is used in an amount from 0.02 to 5 milligram atoms, in terms of lithium atoms, per 100 grams of monomer.

6. A process according to claim 1 wherein said conjugated diene compound is at least one compound selected from the group consisting of 1,3-butadiene, isoprene, 1,3-pentadiene, 2,3-dimethyl butadiene, and 2-phenyl-1,3-butadiene.

7. A process according to claim 1 wherein said alkenyl aromatic hydrocarbon compound is at least one compound selected from the group consisting of styrene, divinyl benzene, α-methyl styrene, β-methyl styrene, vinyl toluene, and 1-vinyl naphthalene.

8. A process according to claim 1 wherein said anionic surface active agent having a group —SO$_3$M or —OSO$_3$M is at least one compound selected from the group consisting of alkylaryl sulfonates, amide-bound sulfonates, ester-bound sulfonates, sulfuric ester salts of higher alcohols, and ester-bound sulfuric ester salts.

9. A process according to claim 1 wherein said anionic surface active agent having a group —SO$_3$M or —OSO$_3$M is at least one compound selected from the group consisting of dodecylbenzene sulfonates, tetradecylbenzene sulfonates, hexadecylbenzene sulfonates, octadecylbenzene sulfonates, dibutylnaphthalene sulfonates, n-hexylnaphthalene sulfonates, dibutylphenylsulfonates, formalin condensates of naphthalene sulfonates, N-methyl-N-oleoyl taurates, N-methyl-N-lauroyl taurates, N-phenyl-N-stearoyl taurates, laurylamide N-methyl-N-methane sulfonates, salts of condensation products of oxyethane sulfonate and oleic acid, salts of dioctyl sulfosuccinate, salts of dioctyl sulfomaleate, sulfuric ester salts of lauroyl oleoyl, and stearoyl alcohols, sulfuric ester salts of lauroyl trimethylene glycol, sulfuric ester salts of caproyl ethylene glycol, and sulfuric ester salts of polyoxyethylene alkyl ether and of polyoxyethylene alkylphenyl ether.

10. A process according to claim 1 wherein said anionic surface active agent having a group —$SO_3M$ or —$OSO_3M$ is at least one compound selected from the group consisting of potassium dodecylbenzene sulfonate, potassium tetradecylbenzene sulfonate, potassium hexadecylbenzene sulfonate, potassium octadecylbenzene sulfonate, potassium laurylamide N-methyl-N-methane sulfonate, potassium salt of dioctyl sulfosuccinate, potassium salt of sulfuric ester of lauryl alcohol, and potassium salt of sulfuric ester of caproyl ethylene glycol.

11. A process according to claim 1 wherein said surface active agent is used in an amount from 0.01 to 10 gram atoms on the basis of the alkali metal atoms per atom of lithium in said initiator.

12. A process according to claim 1 wherein said Lewis base is at least one compound selected from the group consisting of diethyl ether, di-n-propyl ether, di-isopropyl ether, di-n-butyl ether, ethyl butyl ether, ethylene glycol dimethyl ether, ethylene glycol diethyl ether, diethylene glycol dimethyl ether, diethylene glycol diethyl ether, triethylene glycol dimethyl ether, tetrahydrofuran, α-methoxytetrahydrofuran, α-methyltetrahydrofuran, dioxane, 1,2-dimethoxybenzene, trimethylamine, triethylamine, N,N,N', N'-tetramethyl ethylenediamine, N-methylmorpholine, N-ethylmorpholine and N-phenylmorpholine.

13. A process according to claim 1 wherein said Lewis base is at least one compound selected from the group consisting of diethyl ether, di-n-butyl ether, ethylene glycol dimethyl ether, ethylene glycol diethyl ether, diethylene glycol diethyl ether, tetrahydrofuran, dioxane, triethylamine, and N,N,N',N'-tetramethyl ethylenediamine.

14. A process according to claim 1 wherein said Lewis base is used in an amount from 0.02 to 100 moles per mole of the lithium atoms.

* * * * *